(12) United States Patent
Nuuja

(10) Patent No.: US 9,380,188 B1
(45) Date of Patent: Jun. 28, 2016

(54) APPARATUS AND METHOD FOR IMPROVING COLOR ACCURACY IN A SCAN

(71) Applicant: Xerox Corporation, Norwalk, CT (US)

(72) Inventor: Robert Eero Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/687,673

(22) Filed: Apr. 15, 2015

(51) Int. Cl.
*G03F 3/08* (2006.01)
*H04N 1/60* (2006.01)
*H04N 1/04* (2006.01)

(52) U.S. Cl.
CPC ............. *H04N 1/603* (2013.01); *H04N 1/04* (2013.01); *H04N 2201/0094* (2013.01)

(58) Field of Classification Search
USPC .................................................. 358/1.1–1.18
See application file for complete search history.

(56) References Cited

U.S. PATENT DOCUMENTS

| | | | |
|---|---|---|---|
| 8,837,822 B2 * | 9/2014 | Zimmer | G06F 3/041 345/600 |
| 9,025,870 B2 * | 5/2015 | Ozawa | H04N 1/58 382/164 |

* cited by examiner

*Primary Examiner* — Douglas Tran

(57) ABSTRACT

An input imaging system and method for improving color accuracy in a scanning of a document are disclosed. For example, the apparatus includes a scanning unit for scanning a document, a user interface for receiving a color value in the document and a processor coupled to the scanning unit and the user interface to identify a portion of the document that includes the color value that is received via the user interface, generate a scanned document having a corresponding portion that is coded with an inaccurate color value and adjusting the inaccurate color value of the corresponding portion in the scanned document to match the color value that is received.

20 Claims, 4 Drawing Sheets

APPARATUS AND METHOD FOR IMPROVING COLOR ACCURACY IN A SCAN

The present disclosure relates generally to improving the quality of scanned documents and, more particularly, to an apparatus and method for improving color accuracy in a scan.

BACKGROUND

When scanning documents, limitations in scanner technology prevent color from being captured without some degree of error in color reproduction. For example, documents that have colors that were originally defined within the document in a spot color system are not captured in a manner, which captures those colors accurately. In other words, the color produced in the scan document does not accurately match the color in the original document that was scanned. Previous methodologies would require that the scanned document be edited manually after the scan.

SUMMARY

According to aspects illustrated herein, there are provided an apparatus and method for improving a color accuracy in a scanning of a document. One disclosed feature of the embodiments is an apparatus comprising a scanning unit for scanning a document, a user interface for receiving a color value in the document and a processor coupled to the scanning unit and the user interface to identify a portion of the document that includes the color value that is received via the user interface, generating a scanned document having a corresponding portion that is coded with an inaccurate color value and adjusting the inaccurate color value of the corresponding portion in the scanned document to match the color value that is received.

Another disclosed feature of the embodiments is a method for improving color accuracy in a scan comprising scanning a document, identifying a portion of the document that includes a color, receiving a color value for the color in the portion of the document, generating a scanned document having a corresponding portion that is coded with an inaccurate color value and adjusting the inaccurate color value of the corresponding portion in the scanned document to match the color value that is received.

Another disclosed feature of the embodiments is a non-transitory computer-readable medium having stored thereon a plurality of instructions, the plurality of instructions including instructions, which when executed by a processor, cause the processor to perform operations comprising scanning a document, identifying a portion of the document that includes a color, receiving a color value for the color in the portion of the document, generating a scanned document having a corresponding portion that is coded with an inaccurate color value and adjusting the inaccurate color value of the corresponding portion in the scanned document to match the color value that is received.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for improving color accuracy in a scan. As discussed above, when scanning documents, limitations in scanner technology prevent color from being captured without some degree of error in color reproduction. For example, documents that have colors that were originally defined within the document in a spot color system are not captured in a manner, which captures those colors accurately. In other words, the color produced in the scan document does not accurately match the color in the original document that was scanned.

Embodiments of the present disclosure provide an apparatus that receives a specific color value for a text like object that is identified as a portion of a document that is scanned and encodes a scanned version of the document with the specific color. As a result, when the scanned version of the document is displayed or printed, the text like portions of the scanned version of the document will have an accurate color reproduction of the color used in the original document.

Figure 1:
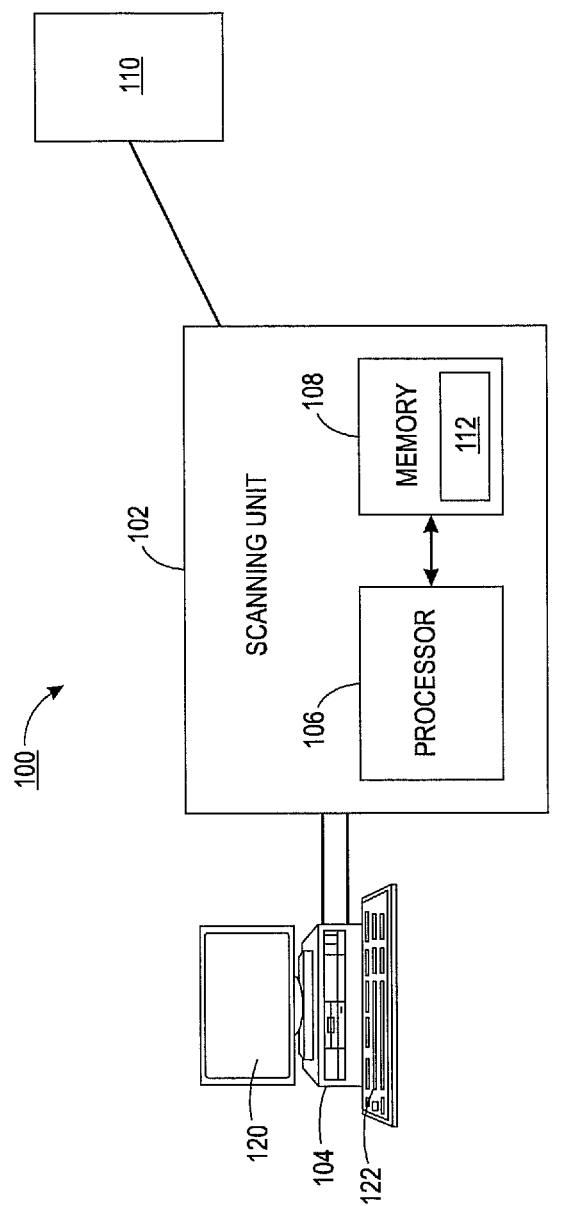
FIG. 1 illustrates an example block diagram of an apparatus of the present disclosure.

FIG. 1 illustrates an example apparatus 100 of the present disclosure. In one embodiment, the apparatus 100 may be a scanner or a multi-function device (MFD), a mobile endpoint device, a smartphone, a tablet device, or any device with scanning capabilities. In one embodiment, the apparatus 100 may include a scanning unit 102, a user interface 104, a processor 106, and a memory 108.

In one embodiment, the scanning unit 102 may receive a document 110 to scan and generate a scanned version of the document 112 that is stored in the memory 108. In one embodiment, the scanning unit 102 may use a mixed raster content (MRC) scan file format. The scanning unit 102 using the MRC file format may be able to identify a plurality of different portions within the document 110.

Figure 2:
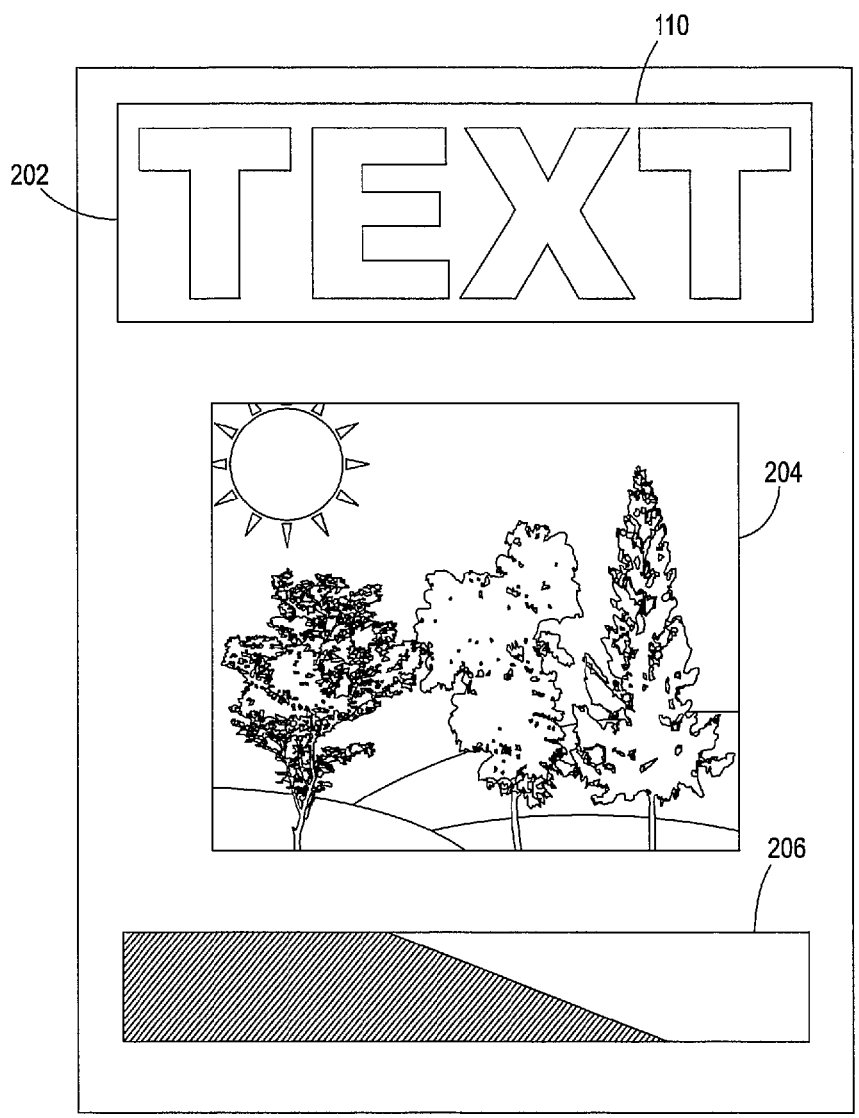
FIG. 2 illustrates an example document illustrating identified portions.

FIG. 2 illustrates an example document 110 that that may be scanned having a plurality of different portions. For example, the portions may include one or more text like objects 202 and 206 and one or more image like objects 204. Although FIG. 2 illustrates two text like objects 202 and 206 and a single image like object 204, it should be noted that the document 110 may include any number of text like objects and image like objects (e.g., more or less).

In one embodiment, the text like object 202 may be text like graphics in the document 110. For example, the text like object 202 may include text, numbers, a company logo or banner, simple graphics, or lines. In one embodiment, the text like object 206 may have a single color value (e.g., a Pantone color value or values within a color scale (e.g., a red, green, blue (RGB) 256 bit color scale)).

In another example, the text like object 206 may include a simple graphic or block image with multiple colors. In one embodiment, the text like objects 202 and 206 include particular colors that have a distance within a color scale (e.g., a red, green, blue (RGB) 256 bit color scale) that is greater than predefined threshold. In other words, the colors within a text like object 202 or 206 have enough contrast that a boundary between two different colors may be easily located.

In contrast, the image like object 204 may have many different colors and shades of similar colors where the boundaries between the colors cannot be easily distinguished. The embodiments of the present disclosure may be applicable to the text like objects 202 and 206.

As noted above, previous scanners would not provide accurate color encoding for the text like objects 202 and 206. For example, currently deployed scanners estimate the color in the text like objects 202 and 206 and distribute the error in the color estimation across the entire text like object 202 or 206. As a result, when the scanned version of the document 112 was displayed or printed, the colors in the text like objects 202 and 206 would have poor color reproduction.

In other words, the document 110 may begin with text like objects 202 and 206 with a specific Pantone color value or colors within the RGB color space. However, when the document 110 is scanned, the scanned version of the document 112 that is generated may have inaccurate colors for the corresponding text like objects 202 and 206. The scanning may introduce noise as can be seen by color histograms.

In one embodiment, the apparatus 100 may receive a specific color value for the one or more text like objects 202 and 206 via the user interface 104. In one embodiment, a user may enter a specific color value using one or more alphanumeric inputs that correspond to the pantone color value, or pantone color code, before the document 110 is scanned via the user interface 104. For example, the user interface 104 may include a display 120 that has a graphical user interface or touch screen display and/or an input device 122 (e.g., a keyboard or a touch screen). In one embodiment, the color value may be a numerical value or a pantone color system value based on a pantone color system.

For example, the user may enter one or more pantone color values for the text like object 202 and one or more pantone color values for the text like object 206. In one embodiment, the scanning unit 102 may scan the document 110 and identify the portions that are the text like objects 202 and 206. The scanning unit 102 may then identify the sections of the text like object 202 that correspond to the one or more pantone color values for the text like object 202 entered by the user and the sections of the text like object 206 that correspond to the one or more pantone color values for the text like object 206.

For example, the corresponding text like object 206 may be identified based upon color values within the scanned version of the document 112 that are close to the color values entered by the user. In one embodiment, a predefined threshold may be used. As a result, using color difference equations, when the difference between the color values of the text like objects 202 and 206 entered by the user and the color values of the scanned version of the document 112 are within the predefined threshold, the scanning unit 102 may identify corresponding text like objects 202 and 206 between the document 110 and the scanned version of the document 112.

In one embodiment, the color difference equations may include delta E equations used by the International Commission on Illumination (CIE). The color difference equations may be used to quantize different RGB values back to a single Pantone value or the original RGB values of the document 110.

In one embodiment, the apparatus 100 may then automatically adjust the inaccurate color values of the corresponding portion in the scanned version of the document 112 to match the color values entered by the user. For example, the inaccurate color values of the corresponding portion or portions in the scanned version of the document 112 may be adjusted by an amount determined from application of the color difference equations.

This process may be repeated for each segmented text like object (e.g., text like objects 202 and 206) that are detected within the document 110. The resulting layered page images may then be saved as a mixed raster content (MRC) or are flattened to a single raster image per page.

In one embodiment, the apparatus 100 may display the text like objects 202 and 206 with the identified sections that correspond to the one or more pantone color values entered by the user on the display 120 of the user interface 104. The user may then confirm that the text like objects 202 and 206 are correctly identified and the correct sections are receiving the pantone color values entered by the user.

In another example, the scanning unit 102 may scan the document 110 and identify the one or more text like objects 202 and 206. The scanning unit 102 may automatically estimate the pantone color values of one or more sections of the text like objects 202 and 206. The scanner 100 may then display to the user in the display 120 of the user interface 104 a text like object 202 and the estimated pantone color values of one or more sections of the text like object 202. The user may then confirm via the user interface 104 whether the estimated pantone color values are correct or incorrect.

If the estimated pantone color values are incorrect, the apparatus 100 may repeat the color estimation process and display a different pantone color value to the user to receive confirmation. In another example, if the estimated pantone color values are incorrect, the user interface 104 may provide a list of similar pantone color values and allow the user to select one of the pantone color values in the list. In another example, if the estimated pantone color value is incorrect, the user interface 104 may prompt the user to enter the specific color value or values for each section of the text like objects 202 and 206.

As a result, the scanned version of the document 112 may be encoded with an exact or nearly exact match to the actual color or colors of the text like objects 202 and 206 in the document 110. In other words, a portion of the document 110 that has a particular pantone color value may have the same pantone color value in a corresponding portion within the scanned version of the document 112. Said another way, the text like object 202 may have the same pantone color values in the document 110 and the scanned version of the document 112 and the text like object 206 may have the same pantone color values in the document 110 and the scanned version of the document 112. Thus, when the scanned version of the document 112 is displayed or printed, the colors on the scanned version of the document 112 may be the same or approximately the same as the colors in the document 110 (e.g., the original document).

Figure 3:
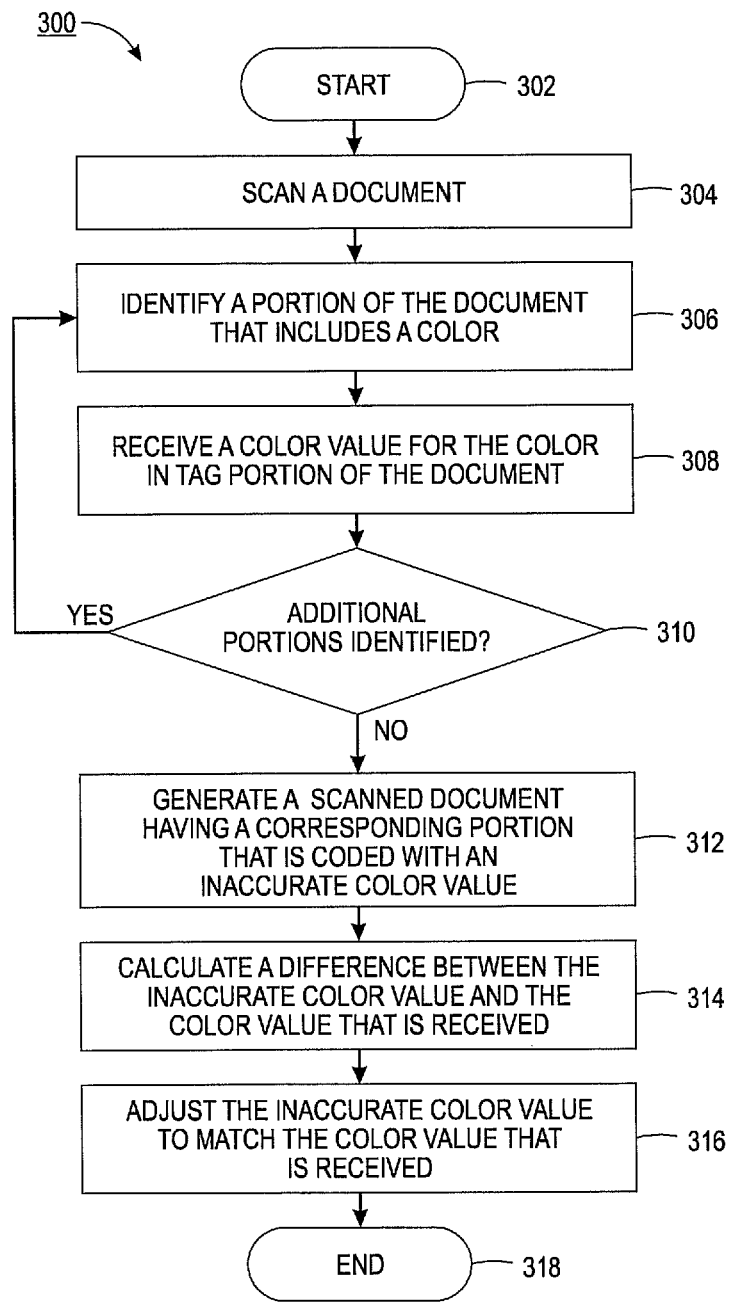
FIG. 3 illustrates an example flowchart of one embodiment of a method for improving color accuracy in a scan.
Figure 4:
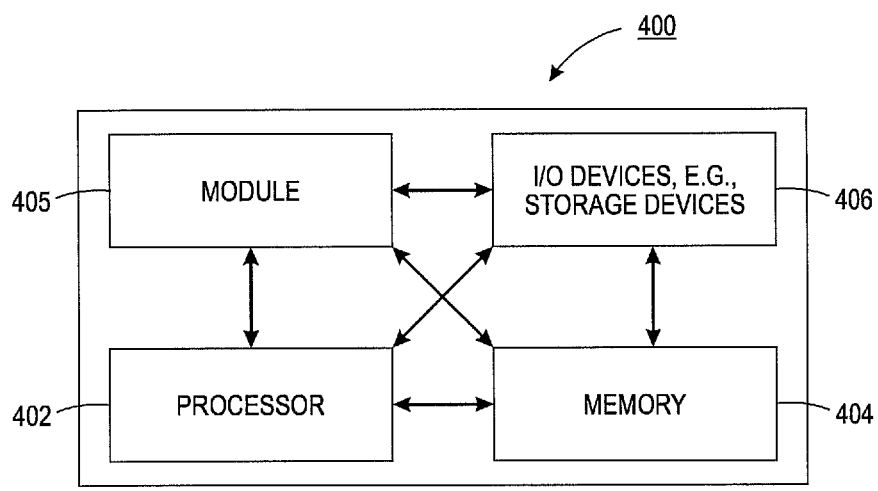
FIG. 4 illustrates a high-level block diagram of a computer suitable for use in performing the functions described herein.

FIG. 3 illustrates a flowchart of a method 300 for improving color accuracy in a scan. In one embodiment, one or more steps or operations of the method 300 may be performed by the apparatus 100 or a computer as illustrated in FIG. 4 and discussed below.

At step 302 the method 300 begins. At step 304, the method 300 scans a document. In one embodiment, the document may be scanned by a scanning unit that uses an MRC scan file format and is capable of identifying a plurality of different portions within the document.

At step 306, the method 300 identifies a portion of the document that includes a color. In one example, the document may include different portions such as text like objects and image like objects. In one example, the text like objects may include one or more sections that have different colors. In one example, two different colors may have a distance within a color scale or system (e.g., a red, green, blue (RGB) 256 bit color scale) that is greater than a predefined threshold. In other words, the different colors in a text like object may have enough contrast that a boundary between the different colors may be easily identified or located.

At step 308, the method 300 receives a color value for the color in the portion of the document. In one embodiment, the color value may be received as an alphanumeric input via a user interface. For example, a user may enter a specific color value (e.g., a color value in a pantone color system) that is associated with the portion of the document that includes the color that is identified from the scanning.

In one example, the method 300 may automatically estimate a color value of the portion and displays the estimated color value to the user for confirmation. For example, the scanner may estimate a color and compare the color to similar colors stored in memory of the scanner. Based on the comparison, a color value associated with the matching color may be presented to the user via the user interface. The user may then confirm that the color value is correct or reject the color value. If the color value is rejected, the user interface may either repeat the estimation for the color value, present a list comprising a range of color values around the estimated color value or request that the user input the color value.

At step 310, the method 300 determines whether additional portions are identified in the document that is scanned. For example, the method 300 may have identified a plurality of portions in step 306 that are text like objects that includes a particular color or colors. If there are additional portions, then the method 300 may return to step 306 and repeat steps 306-310.

However, if there are no additional portions, the method 300 may proceed to step 312. At step 312, the method 300 generates a scanned document having a corresponding portion that is coded with an inaccurate color value. As discussed above, when a document is scanned, the correct color values that are entered by the user may be changed due to noise introduced from scanning the document. As a result, the corresponding portion or portions between the original document and the scanned document may not have the same color values.

At step 314, the method 300 calculates a difference between the inaccurate color value and the color value that is received. For example, a color difference equation may be used to calculate the difference between the inaccurate color value of the corresponding portion in the scanned document and the color value of the corresponding portion in the original document.

At step 316, the method 300 adjusts the inaccurate color value to match the color value that is received. For example, the difference that is calculated in step 314 may be applied to the inaccurate color value such that the inaccurate color value matches exactly with the color value of the corresponding portion in the original document.

In other words, a portion of the document that has a particular pantone color value may have the same pantone color value in a corresponding portion within the scanned version of the document. Said another way, the portions of the object that are identified as being text like objects may have the same pantone color values in the document and the scanned version of the document.

In one embodiment, steps 314 and 316 may be repeated for each color of the corresponding portion if the corresponding portion has two or more different colors. In addition, steps 314 and 316 may be repeated for each portion that was identified in step 310.

In one example, the scanned document may be stored in memory for later use. For example, the scanned document may be transmitted to be displayed, stored or printed. At step 318 the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to improve color accuracy in a scan, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for improving color accuracy in a scan, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for improving color accuracy in a scan (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for improving color accuracy in a scan (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for improving a color accuracy in a scanning of a document, comprising:
    a scanning unit for scanning the document;
    a user interface for receiving a color value in the document; and
    a processor coupled to the scanning unit and the user interface to identify a portion of the document that includes the color value that is received via the user interface, to generate a scanned document having a corresponding portion that is coded with an inaccurate color value, and to adjust the inaccurate color value of the corresponding portion in the scanned document to match the color value that is received.

2. The apparatus of claim 1, wherein the scanning unit uses a mixed raster content (MRC) scan file format that segments the document into one or more text-like objects and one or more image-like objects.

3. The apparatus of claim 2, wherein the portion of the document comprises the one or more text-like objects.

4. The apparatus of claim 1, wherein the portion comprises a plurality of portions and the color value comprises a plurality of different color values for each one of the plurality of portions.

5. The apparatus of claim 1, wherein the color value comprises a pantone color system value.

6. The apparatus of claim 1, wherein the user interface comprises a graphical user interface that displays the scanned document, the portion that is identified to include the color value and a suggestion of the color value and receives a confirmation that the portion that is displayed was correctly identified and the suggestion of the color value is correct.

7. The apparatus of claim 1, wherein the user interface receives an alphanumeric input corresponding to the color value before the document is scanned.

8. A method for improving a color accuracy in a scanning of a document, comprising:
    scanning, by a processor, the document;
    identifying, by the processor, a portion of the document that includes a color;
    receiving, by the processor, a color value for the color in the portion of the document;
    generating, by the processor, a scanned document having a corresponding portion that is coded with an inaccurate color value; and
    adjusting, by the processor, the inaccurate color value of the corresponding portion in the scanned document to match the color value that is received.

9. The method of claim 8, wherein the scanning comprises segmenting the document into one or more text-like objects and one or more image like objects.

10. The method of claim 9, wherein the portion of the document comprises at least one of the one or more text-like objects.

11. The method of claim 8, wherein the portion comprises a plurality of portions and the color value comprises a plurality of different color values for each one of the plurality of portions.

12. The method of claim 8, wherein the color value comprises a pantone color system value.

13. The method of claim 8, wherein the receiving comprises:
    displaying, by the processor, the scanned document, the portion that is identified to include the color value and a suggestion of the color value; and
    receiving, by the processor, a confirmation that the portion that is displayed was correctly identified and that the suggestion of the color value is correct.

14. The method of claim 13, wherein the portion comprises a plurality of portions and the displaying and the receiving are repeated for each one of a plurality of portions of the document.

15. The method of claim 8, wherein the receiving comprises:
    receiving, by the processor, an alphanumeric input corresponding to the color value before the document is scanned.

16. The method of claim 8, further comprising:
    transmitting, by the processor, the scanned document to be displayed, stored or printed.

17. A method for improving a color accuracy in a scanning of a document, comprising:
    scanning, by a processor, the document;
    identifying, by the processor, a plurality of portions of the document, wherein a first portion of the plurality of portions has a first color and a second portion of the plurality of portions has a second color, wherein a distance between the first color and the second color is greater than a predefined threshold;
    receiving, by the processor, a first color value for the first color and a second color value for the second color;
    generating, by the processor, a scanned document having a corresponding first portion that is coded with a first inaccurate color value and a corresponding second portion that is coded with a second inaccurate color value;
    applying, by the processor, a color difference equation to determine a first difference in color value between the first color value and the first inaccurate color value and a second difference in color value between the second color value and the second inaccurate color value;
    adjusting, by the processor, the first inaccurate color by the first difference in color value to match the first color value and the second inaccurate color by the second difference in color value to match the second color value; and
    transmitting, by the processor, the scanned document to be displayed, stored or printed.

18. The method of claim 17, wherein the scanning uses a mixed raster content (MRC) scan file format that segments the document into one or more text-like objects and one or more image-like objects.

19. The method of claim 18, wherein the portion of the document comprises the one or more text-like objects.

20. The method of claim 17, wherein the color value comprises a pantone color system value.

* * * * *